(12) United States Patent
Chmeissani Raad et al.

(10) Patent No.: US 10,996,350 B2
(45) Date of Patent: May 4, 2021

(54) PHOTON COUNTING

(71) Applicant: INSTITUT DE FÍSICA D'ALTES ENERGIES, Bellaterra (ES)

(72) Inventors: Mokhtar Chmeissani Raad, Barcelona (ES); Machiel Kolstein, Barcelona (ES); José Gabriel Macías Montero, Barcelona (ES)

(73) Assignee: INSTITUT DE FÍSICA D'ALTES ENERGIES, Bellaterra (ES)

( * ) Notice: Subject to any disclaimer, the term of this patent is extended or adjusted under 35 U.S.C. 154(b) by 381 days.

(21) Appl. No.: 15/683,977

(22) Filed: Aug. 23, 2017

(65) Prior Publication Data
US 2017/0350990 A1 Dec. 7, 2017

Related U.S. Application Data

(63) Continuation of application No. PCT/EP2016/053685, filed on Feb. 22, 2016.

(30) Foreign Application Priority Data

Feb. 23, 2015 (EP) .................................. 15382072

(51) Int. Cl.
*G01T 1/24* (2006.01)
*G01T 1/36* (2006.01)
*G01T 1/18* (2006.01)

(52) U.S. Cl.
CPC .............. *G01T 1/247* (2013.01); *G01T 1/246* (2013.01); *G01T 1/366* (2013.01); *G01T 1/18* (2013.01); *G01T 1/241* (2013.01)

(58) Field of Classification Search
CPC ........... G01T 1/18; G01T 1/366; G01T 1/241; G01T 1/246; G01T 1/247

(Continued)

(56) References Cited

U.S. PATENT DOCUMENTS 8,653,435 B2 * 2/2014 Eldesouki ................ G01J 1/46
 250/208.1
2007/0023668 A1 2/2007 Dhurjaty et al.
(Continued)

FOREIGN PATENT DOCUMENTS

WO 0127656 A1 4/2001
WO 0225314 A1 3/2002
WO 2011002452 A1 1/2011

OTHER PUBLICATIONS

Chmeissani, M., et al., "Charge sharing measurements of pixilated CdTe using Medipix-II Chip," Instrumentation and Measurement Technology Conference, Italy, May 18-20, 2004, pp. 787-791.

(Continued)

*Primary Examiner* — David P Porta
*Assistant Examiner* — Carolyn Fin
(74) *Attorney, Agent, or Firm* — Edell, Shapiro & Finnan, LLC

(57) ABSTRACT

A method for photon counting for pixels in a pixelated detector is disclosed, wherein for each of the pixels, one or more neighbouring pixels are defined. The method comprises receiving a charge in one or more of the pixels and comparing for each of the pixels the charge with a trigger threshold. If the charge in a pixel is above the trigger threshold, the charge is registered in the pixel after a registration delay, wherein the registration delay is dependent on the level of the charge received in the pixel in such a way that a registration delay decreases with increasing charge. A counter for a pixel is incremented when the charge is registered and an increment of a counter of the neighbouring pixels is inhibited. Pixelated semiconductor detectors are also disclosed.

18 Claims, 7 Drawing Sheets

(58) Field of Classification Search
USPC .......................................................... 250/206
See application file for complete search history.

(56) References Cited

U.S. PATENT DOCUMENTS

2013/0126748 A1   5/2013  Rao et al.
2014/0334600 A1   11/2014 Lee et al.

OTHER PUBLICATIONS

Chmeissani, M., et al., "Performance limits of a single photon counting pixel system," Nuclear Instuments & Methods in Physics Research A 460, pp. 81-90 (2001).
International Search Report in corresponding PCT Application No. PCT/EP2016/053685, dated Sep. 5, 2016.

* cited by examiner

PRIOR ART

PHOTON COUNTING

CROSS REFERENCE TO RELATED APPLICATIONS

This application is a continuation of International Application No. PCT/EP2016/053685, filed on Feb. 22, 2016, which claims the benefit and priority to European Application No. 15382072.5 filed on Feb. 23, 2015, the entire contents of which are hereby incorporated by reference.

FIELD

The present disclosure relates to photon counting. The present disclosure particularly relates to methods for photon counting in pixelated detectors, and to pixelated detectors particularly suitable for photon counting. The present disclosure also related to imaging devices including such pixelated detectors.

BACKGROUND

X-ray imaging with Photon Counting techniques has started to gain territory since the invention of the wire-chamber. One key feature of photon counting is its ability to be practically immune to electronic and detector noise. One can detect photon by photon, which is not possible with imaging systems such as CCD, in which charges are integrated over a period of time and by the end of the exposure time the charges are digitized. In charge integration mode, the noise is integrated with the signal and later it gets subtracted by measuring the offset signal when there is no X-ray radiation.

In the case of a photon counting mode on the other hand, the signal is fed in a discriminator, as may be seen in FIG. 1. The discriminator (or "comparator") compares the input signal to a fixed value. This fixed value is usually called a trigger threshold or trigger level. If the input signal is above the trigger level, then the discriminator changes level and this increments the counter by 1 count. The trigger threshold should thus be set higher than a noise level.

Good image resolution in a photon counting imaging device comes generally from two factors: high contrast (i.e. high signal to noise ratio) and spatial resolution. This means that with a decreasing size of an individual detector (or "pixel"), the spatial resolution will improve. For this reason, pixelated detectors are often used.

A pixelated detector herein means that a detector electrode is "segmented", i.e. a single electrode is subdivided into a matrix of pixels. These pixels may generally all have the same size, but this is not necessarily so. The deposit of energy in a detector can thus be registered at the level of individual pixels, rather than at the level of the detector as a whole. The deposit of energy may herein be referred to as an "event". And such a deposit of energy may generally be caused by the decay of a nuclear material. This form of detection is often used in nuclear medical imaging.

Different kinds of detectors are known such as detectors based on scintillating crystals, and so-called semiconductor detectors. Because of the aforementioned spatial resolution, room temperature pixelated solid state detectors based on semiconductor material are generally preferred. When highly energetic photons are "detected" in a semiconductor detector, electron-holes are created. The electrons and holes move in opposite directions towards the electrodes because of a bias voltage applied. In a pixelated detector, the location of registration within the electrodes can be determined due to the fact that the electrodes are pixelated, so that the location of impact within the detector may be determined.

With photon counting one can achieve a high contrast image because the detection system is noise free at the level of electronics and detector leakage current. However when it comes to the spatial resolution, photon counting can also suffer from small pixel size detector.

In the case of an "event", the captured photon in the semiconductor detector generates a small charge cloud with a radius of about 10 μm. Because of the bias voltage, this charge cloud starts to drift to the detector electrode and during this drifting time, the transverse size of the charge cloud expands according the diffusion formula of Fick's law. It can thus happen that the energy of a single event is collected on different pixels. If the energy deposited is above the trigger threshold in more than one pixel, the event thus is counted more than once.

For example in "*Charge sharing measurements of pixilated CdTe using Medipix-II Chip*" by M. Chmeissani et al., (published in Instrumentation and Measurement Technology Conference, Italy, 18-20 May 2004, pages 787-791) and in "*Performance limits of a single photon counting pixel system*" by M. Chmeissaini, B. Mikulec, Nuclear Instruments & Methods in Physics Research A 460 (2001) pages 81-90) it is reported that most of the X-ray photons emitted from Am241 and captured by an 800 micron thick CdTe having a pixel size of 55×55 microns, suffer from charge sharing. The diameter of the cloud is larger than the pixel size which causes the charge to be collected by more than one pixel. In photon counting, the counter is incremented by 1 if the energy deposited by the photon in the pixel is above the trigger threshold, otherwise it remains the same. Charge sharing thus means that a single event may be counted two or more times.

In order to clarify further, a simple example is given: let's assume that the trigger threshold in every pixel is set to 10 keV, and let us imagine that an X-ray photon of 30 keV has deposited its energy between two adjacent pixels, one with 25 keV and one with 5 keV. In such a scenario, one pixel will effectively trigger and the other pixel does not and this is the way it should be. A single event is registered a single time.

However, let's imagine that the energy deposited was 15 keV on each pixel. In this case, the two pixels will trigger (as the energy deposited is above the trigger level) and their counters will be increment by 1. Thus, a single event is actually counted twice and this is not correct.

In yet a further scenario, let's imagine that the photon impact point was in the centre of 4 pixels and the energy of the photon is shared equally, among the 4 pixels (7.5 keV/pixel). In such a case, none of the pixels will trigger and the photon effectively will not be counted.

From the above examples, one can see on the one hand that charge sharing can lead to double counting and this reduces the contrast of the image. In order to reduce double counting, the trigger threshold could be set higher. But in this case, charge sharing can effectively reduce the detection efficiency of the system, since an event can be split between pixels and none of the pixels will effectively trigger. Because of charge sharing, especially with small pixels, it is impossible to achieve energy spectroscopy with photon counting.

It is an object of the present disclosure to provide methods and systems that avoid or at least reduce some of the aforementioned problems.

SUMMARY OF THE DISCLOSURE

In a first aspect, a method for photon counting for pixels in a pixelated detector is provided. For each of the pixels, one or more neighbouring pixels can be defined, and the method comprises receiving a charge in one or more of the pixels and comparing the charge with a trigger threshold. If the charge is above the trigger threshold, then the charge in the pixels is registered with a registration delay, wherein the registration delay is dependent on the level of the charge received in pixel, in such a way that a registration delay decreases with increasing charge. A counter for a pixel is incremented when the charge is registered; and an increment of a counter of the neighbouring pixels is inhibited.

In accordance with this aspect for a photon counting mode, when a charge is deposited, it is only registered after a delay. The delay depends on the charge collected at each pixel. The higher the charge collected at a pixel is, the shorter the delay should be. If a charge is shared between various pixels, the charge will first be registered with the pixel that has collected the largest share of the charge. This pixel could be regarded to be the master pixel (for that specific event). Then, the counter for the master pixel is increased, and at the same time, the counters for the neighbouring pixels are inhibited. The master pixel may communicate this to the neighbouring "slave" pixels.

It should be clear that every event will have one master pixel and can have a plurality of slave pixels. It should also be clear that the master pixel can change for each event.

The trigger threshold does not need to be set high (it just needs to be above the noise level), since there is no problem if the charge is shared between pixels. In any case, only a single counter will be incremented. In this manner, spatial resolution can be high by allowing a small pixel size, and detection efficiency does not need to suffer.

In some examples, the method may further comprise collecting the charge of the neighbouring pixels. In these examples, not only an event can be registered, but also the total energy of an event may be registered by summing the charge of neighbouring pixels. The master pixel may request the slave pixels to share or send information concerning the charge received in each of them.

In some examples, registering the charge in the pixels with a registration delay may comprise discharging a capacitor for each of the pixels at a fixed rate from a maximum level to a reference level, and after a set delay. The reference level can be dependent on the charge received in the corresponding pixel. In these examples, in each of the pixels where the energy deposited is above the trigger level, a capacitor may be discharged after a given delay. The moment at which a discharge of a capacitor starts is substantially the same for all the pixels. The capacitors may be programmed to start a discharge at a set or predefined delay after the moment of peak of a pulse received in the pixel. The moment of peak or "peaking time" may be difficult to determine. The usual methods of determining the peaking time may be used, such as e.g. methods based on the time span between 10%-90% of the peak value. Since the moment of peak in a single event will be substantially the same for each of the pixels, the moment of starting the discharge will be substantially the same as well.

If the moment at which discharge starts is the same for the capacitors of the triggered pixels, and the starting voltage is the same, and also the discharge rate is the same, then the completion of a discharge will only depend on the voltage level at the end. In these examples, this voltage level at the end of discharge may be correlated directly to the charge collected by a pixel. In particular, the reference voltage level may be related directly to the peak value of the pulse received in a pixel. A peak hold circuit may be used for this purpose. This will ensure that the capacitor corresponding to the pixel with the highest charge will discharge first. Its counter can thus be incremented and the counters of neighbouring pixels inhibited.

In some examples, the completion of a discharge in such a case may be determined by comparing the voltage level with a reference level in a discriminator, the reference level depending on the peak of the pulse.

The registration delay may thus include a delay for a pulse to reach its peak value (substantially the same for all pixels), a set delay from peak value to the start of the discharge of the capacitor (the same for all pixels), and the duration of the actual discharge (depending on the reference level and therefore different for each of the pixels, and shorter for the higher charges).

In some examples, registering the charge in the pixels with a delay may comprise for each of the pixels discharging a capacitor after a discharge delay at a fixed rate from a maximum level to a reference level, wherein the discharge delay is dependent on the charge received in the corresponding pixel. By changing the moment that discharge starts, it can also be ensured that one capacitor discharges before another. By linking the moment of discharge with the charge collected by a pixel, once again it can be ensured that a charge is registered first with the pixel receiving the highest charge.

In further examples, a plurality of trigger thresholds with different values may be defined for each of the pixels, in such a way that the predefined trigger delay decreases with increasing value of the threshold. The received charge can thus be compared with each of the trigger thresholds, and if the charge in a pixel is above one or more trigger thresholds, the trigger with the shortest delay is registered. As in the previously described embodiments, the first registration can determine which pixel is the master pixel for a specific event. The counters for neighbouring slave pixels can thus be inhibited.

In another aspect, a pixelated semiconductor detector is provided having a plurality of pixels, and a read-out circuit. The read-out circuit is configured, for each of the pixels, to register the charge in the pixels with a registration delay, wherein the registration delay is dependent on the level of the charge received in the pixel in such a way that a registration delay decreases with increasing charge. The readout-circuit further comprises a counter for counting a registration of a charge, and a communication module for communicating the registration to neighbouring pixels.

In this aspect, each of the pixels is provided with communication capabilities to communicate with neighbouring pixels. Once a charge of an event is registered with one of the pixels, the neighbouring pixels thus receive a signal that indicates that they should not count the event. Double or triple counting can thus be avoided. This again makes it possible to set the trigger threshold relatively low.

The readout-circuit may further be adapted or configured in accordance with any of the examples substantially as hereinbefore described.

In yet another aspect, an imaging device comprising a pixelated detector according to any of the examples described herein is provided.

Throughout the present disclosure, the delays introduced in various examples may be introduced with either digital or analog circuitry.

BRIEF DESCRIPTION OF THE DRAWINGS

Non-limiting examples of the present disclosure will be described in the following, with reference to the appended drawings, in which.

DETAILED DESCRIPTION

Figure 1:
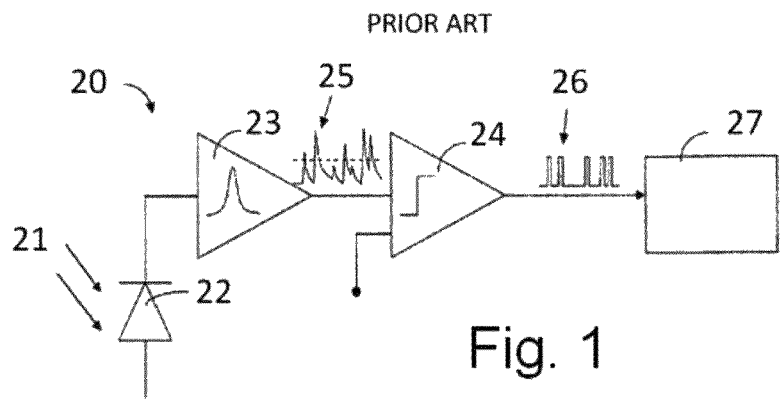
FIG. 1 schematically illustrates a prior art method and system for photon counting.

FIG. 1 schematically illustrates a prior art method and system for photon counting. Reference sign 20 refers to a pixel of a pixelated electrode with corresponding detector material. X-ray photons 21 can impinge on a phototransducer such as a photodiode 22. This can create a small charge packet of electrons, which can be shaped to a pulse 25 by a pulse shaper circuit 23. A comparator 24 or "discriminator" compares the generated pulses 25 to a reference value or trigger level.

Every time the amplitude of the pulses 25 exceeds the trigger level, a first value, for example "high" or a digital one, is assigned to the output signal of the comparator 24, and every time the pulses are below the trigger level, a second value, for example "low" or digital zero, is assigned to the output signal of the comparator 24.

This way, a binary signal is generated, comprising a pulse train 26. The pulses in the pulse train 26 are then counted by means of a digital counter 27 in order to provide a count value for the impinging incident photons 21.

As discussed before, whenever a charge is shared between pixels, a single event can be counted more than once. If the pulse of more than one pixel reaches above the trigger, for each of the pixels a digital one will be assigned.

Figure 2A:
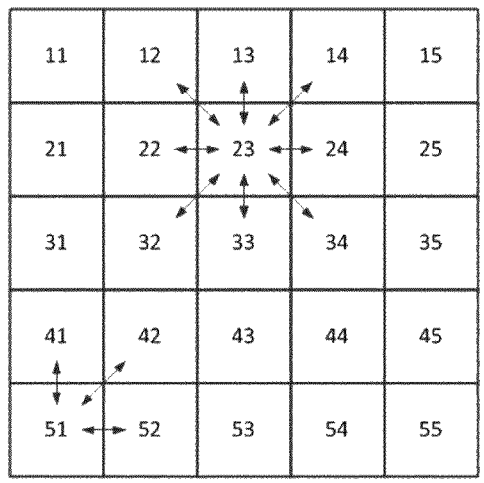
FIG. 2a schematically illustrates a pixelated detector according to an example.

FIG. 2a schematically illustrates a pixelated detector according to an example. A simplified example having an array or matrix of 5×5 pixels is shown. In accordance with this example, each of the pixels is provided with a communication module that enables communication between neighbouring pixels. For example, to effectively avoid double counting in pixel 23 (and neighbouring pixels), pixel 23 is enabled to communicate with pixels 12, 13, 14, 22, 24, 32, 33 and 34. Pixel 51 is enabled in a similar manner to communicate with pixels 41, 42 and 52.

If in a specific event, pixel 23 is the master pixel, pixel 23 can inhibit the counter of each of the slave pixels 12, 13, 14, 22, 24, 32, 33 and 34. Also, the master pixel can request each of the slave pixels to communicate the charge they received so that the total charge can be assigned to the master pixel.

In most examples, neighbouring pixels may be defined herein as a pixel sharing a portion of a border with another pixel (such as e.g. pixels 23 and 24), or at least a point along the border (such as e.g. pixels 12 and 23). In further examples, neighbouring pixels may be defined as pixels between which charge sharing can potentially occur. The pixels between which charge sharing could potentially occur could be calculated by taking into account the drift potential (depending on bias voltage, detector thickness and pixel size, photon energy levels).

Figure 2B:
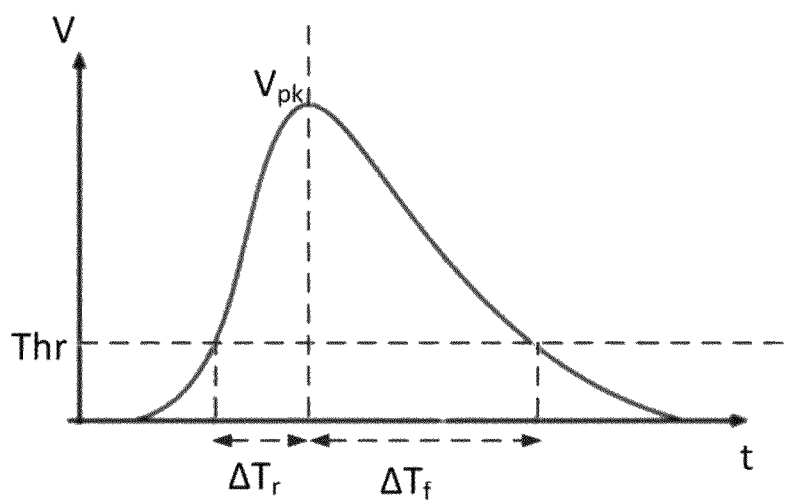
FIG. 2b schematically illustrates some characteristics of a pulse as may be received in a detector.

FIG. 2b schematically illustrates some characteristics of a pulse as may be received in a detector. The illustrated pulse may be output of a pulse shaper.

It is known that the shape of a pulse may vary. The shape of the pulse can be characterised by a peak voltage ($V_{pk}$), the rise time ($\Delta T_r$), i.e. the time between the moment the signal passes the trigger threshold and the moment of peak voltage, and fall time ($\Delta T_f$), i.e. the time between the moment of peak voltage and the moment the signal passes through the trigger threshold again.

In case of charge sharing, the pulses received by various pixels may generally be similar in that the rise time and fall time will be substantially the same. The peak voltage will however vary. The pixel that receives the highest charge will have the highest peak voltage.

FIGS. 3a-3e illustrate an example of a method and a system for photon counting according to an implementation.

As proposed in various examples disclosed herein, a key to the solution for the charge sharing problem is that it can be determined which pixel has the maximum charge deposition. Then that pixel can be assigned to be the master pixel that should have its counter incremented and, if needed, the energy digitized and stored. The neighbouring pixel(s) that may receive part of the charge, should not increment their counters. In some examples, the neighbouring pixels may pass the charge that they have collected to the master pixel for further processing.

Figure 3A:
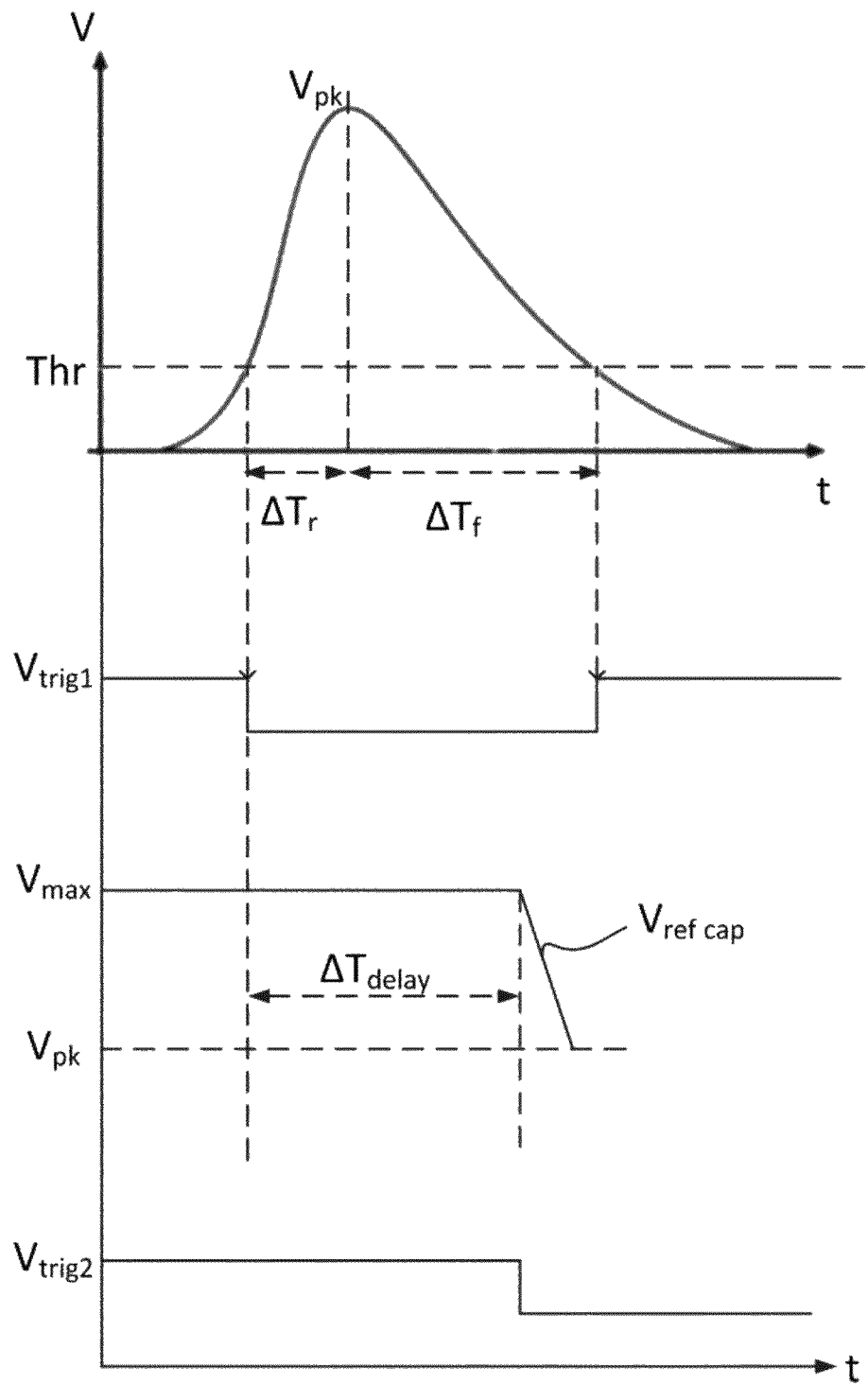
FIGS. 3a-3e illustrate an example of a method and a system for photon counting according to an implementation.
Figures 3B, 3C:
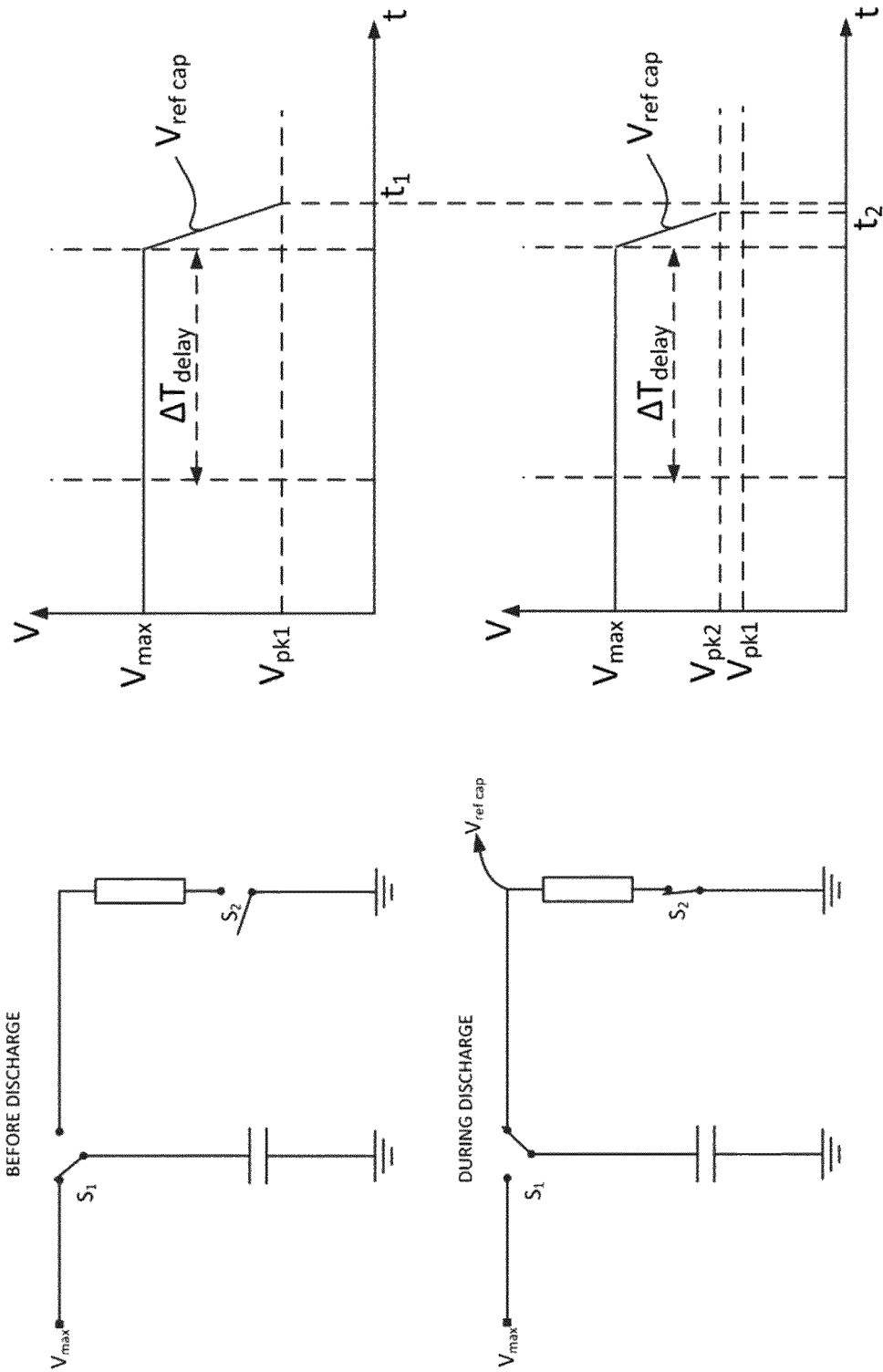

FIGS. 3a and 3b illustrates a first principle upon which the assignment of a master pixel can be based. In each of the pixels, wherein a charge above the threshold is received, the discharge of a capacitor is triggered. However, this discharge only occurs after a set delay $\Delta T_{delay}$. The set delay may be the same for all pixels.

The difference in discharge between pixels is caused by setting a reference level at which discharge is considered completed to the peak level of the received signal (taking into account the gain of the pixel electronics). A peak hold circuit may be used for this purpose.

A higher peak ($V_{pk}$) means the energy deposited in that pixel is higher and that the discharge will be completed sooner. This is illustrated in FIG. 3b: since $V_{pk2}$ is higher (and $V_{max}$, as well as the discharge rate, and $\Delta T_{delay}$ is the same in both cases), the discharge of pixel 2 is completed sooner and this pixel can thus be assigned to be the master pixel. The completion of the discharge causes a second trigger.

The set delay for starting the discharge may preferably be linked to the rise time, such that it can be ensured that the correct peak voltage can be determined before discharge.

Figure 3D:
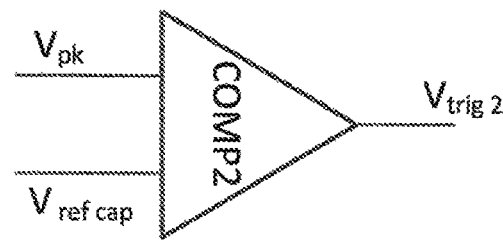

FIGS. 3c and 3d schematically illustrate mechanisms of the first and second triggers. When the signal reaches the trigger threshold, (after a set delay), switch 1 is flipped, and switch 2 is closed. This causes the discharge of the capacitor through a resistance. During the discharge, the voltage level of the capacitor may be input for a second comparator or discriminator, illustrated in FIG. 3d.

The comparator can compare the peak voltage level registered in a pixel with the voltage of the capacitor. As the capacitor discharges, this voltage decreases. At the moment the voltage of the capacitor equals the peak voltage, the discharge is completed. This moment can be communicated to neighbouring pixels, such that their counter is not increased.

Although in this example, the reference level is set equal to the peak voltage level of the pulse, it should be clear that alternatives are possible as long as the reference level correctly varies with the energy deposited in the pixel, i.e. the reference level should be higher for higher energies.

In some examples, the charge collected by neighbouring pixels may then be passed on to the master pixel, such that the total charge can be determined.

Figure 3E:
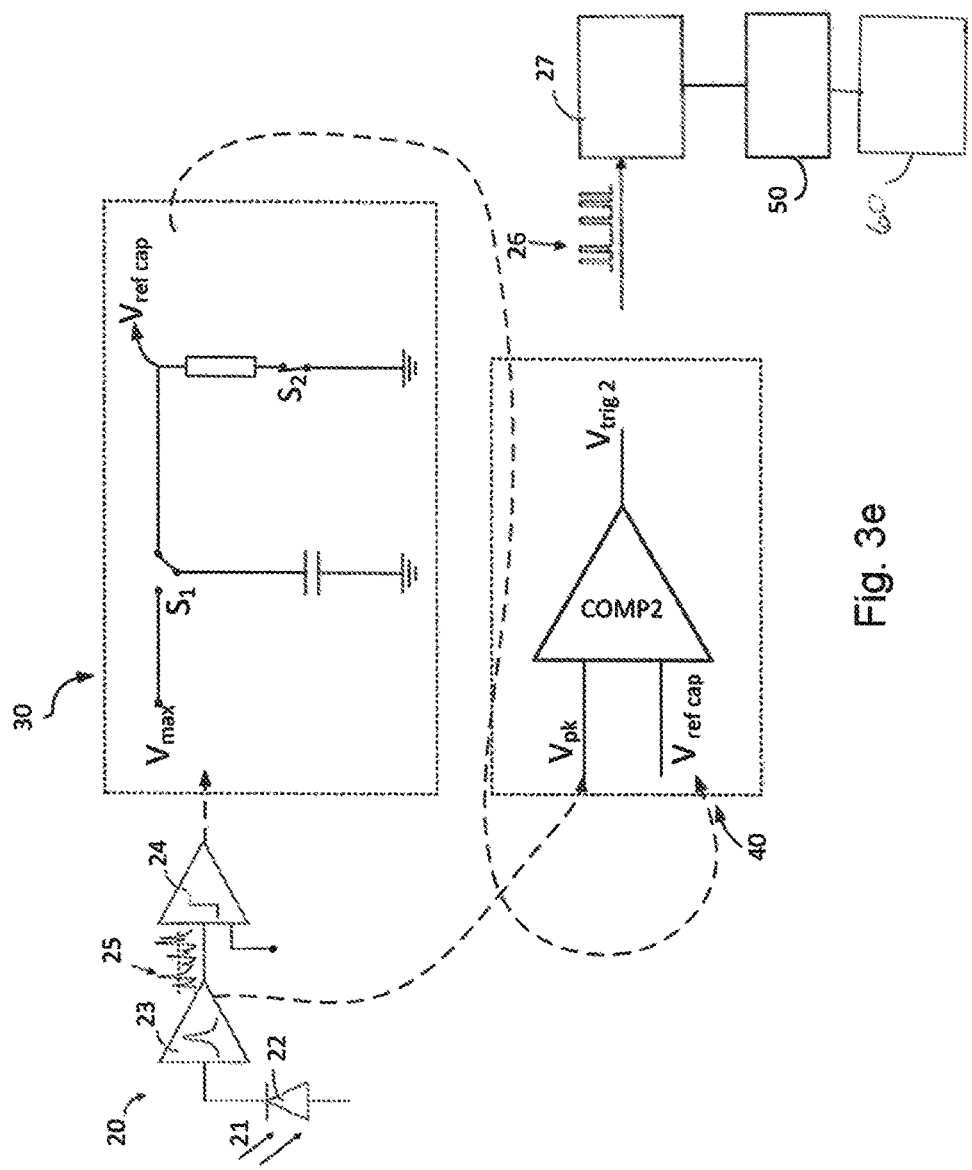

FIG. 3e schematically illustrates a system and method for photon counting in accordance with this implementation. As explained before with reference to FIG. 1, photons 21 may impinge on a photodiode 22. The signal may be passed through a shaper 23. The first trigger may be caused as before, i.e. reaching a trigger level. Comparator or discriminator 24 may be used as described before with reference to FIG. 1. However, as a consequence of this trigger, after a certain delay the switches S1 and S2 of trigger mechanism 30 reach the positions indicated in FIG. 3e. The system includes a readout circuit that includes a summing module 60 in communication with the communication module 50. The summing module is configured to add the charge collected by neighboring pixels in an event.

The voltage level of the capacitor is used as input for the second trigger mechanism 40. The other input may be the peak voltage and may be provided by shaper 23. The output of the second trigger may be binary pulses 26 which may be counted by counter 27. Communication module 50 may communicate the event to neighbouring pixels such that double counting can be avoided.

In normal operation, the user knows the range of the X-ray photons that will be emitted from the X-ray tube or natural source. Based on this knowledge the user can set the maximum dynamic range of the pixel. If the X-ray tube emits a spectrum of X-ray photons from 20 keV to 100 keV and if one assumes that the gain of the pixel electronic is 10 mV/keV, then the maximum expected pulse height is 1000 mV. Let us assume that the pulse shape of the pixel has a rise-time of 100 nsec, and a fall time of 400 nsec, and the maximum jitter time of the discriminator is around 25 nsec. In this example the $\Delta T_w$ (time-walk)=rise-time+jitter time=125 nsec.

For this example one may set the minimum pixel threshold at 20 mV above the base line to make sure that the level is about 5 or 6 standard deviations above the random noise level.

Let us assume that a photon of 80 keV has impacted close to the edge of the pixel in which 75% of the charge was deposited and that 25% of the charge is deposited in the adjacent pixel. Each pixel, in this example, can have a reference-capacitor that is already charged to 1000 mV (equivalent to 100 keV of the maximum energy level of the X-ray photon. The maximum level can be adjustable).

With a signal charge equivalent to 60 keV in one pixel and 20 keV in the adjacent pixel, both pixels will trigger because the threshold of the discriminator was set for 2 keV (20 mV). The pixel trigger will initiate, after a set delay of peak time (100 nsec in this example), the discharge of the reference capacitor at a fixed rate of RC=50 nsec (decay constant). I.e. the discharge of the capacitor will start 125 nsec after the peak (and 225 nsec after reaching the trigger value).

In the first pixel, one can say that the discriminator-2, comparing the level from the discharging reference-capacitor and peak hold signal of the 60 keV is at around 55 nsec ahead in time of the trigger coming from the discriminator-2 in the second pixel by comparing the level of the discharging reference-capacitor and the peak signal of 20 keV. The trigger output from discriminator-2, in each pixel, will open switch 2 to stop the discharge of reference-capacitor. The registration of the charge will thus start to happen 125 nsec after the peak moment (and the peaking time will be substantially the same for all pixels). The highest charge will be registered 150 nsec after peaking.

In this example, the trigger from discriminator-2 of the pixel with 60 keV energy deposition, will be communicated first to all surrounding triggered pixels to indicate two things, namely to inhibit their counters, and to request the peak hold signal to be communicated to the master pixel (for further processing specially in spectroscopy information is needed). The energy collectively registered in all the triggered pixels can be measured in two ways: in an analogue scheme by summing up the values of the voltage of the reference-capacitor in each triggered pixel, or alternatively in a digital scheme by measuring the time for the ref-capacitor to discharge from $V_{max}$ to $V_{pk}$ in every pixel.

Figure 4A:
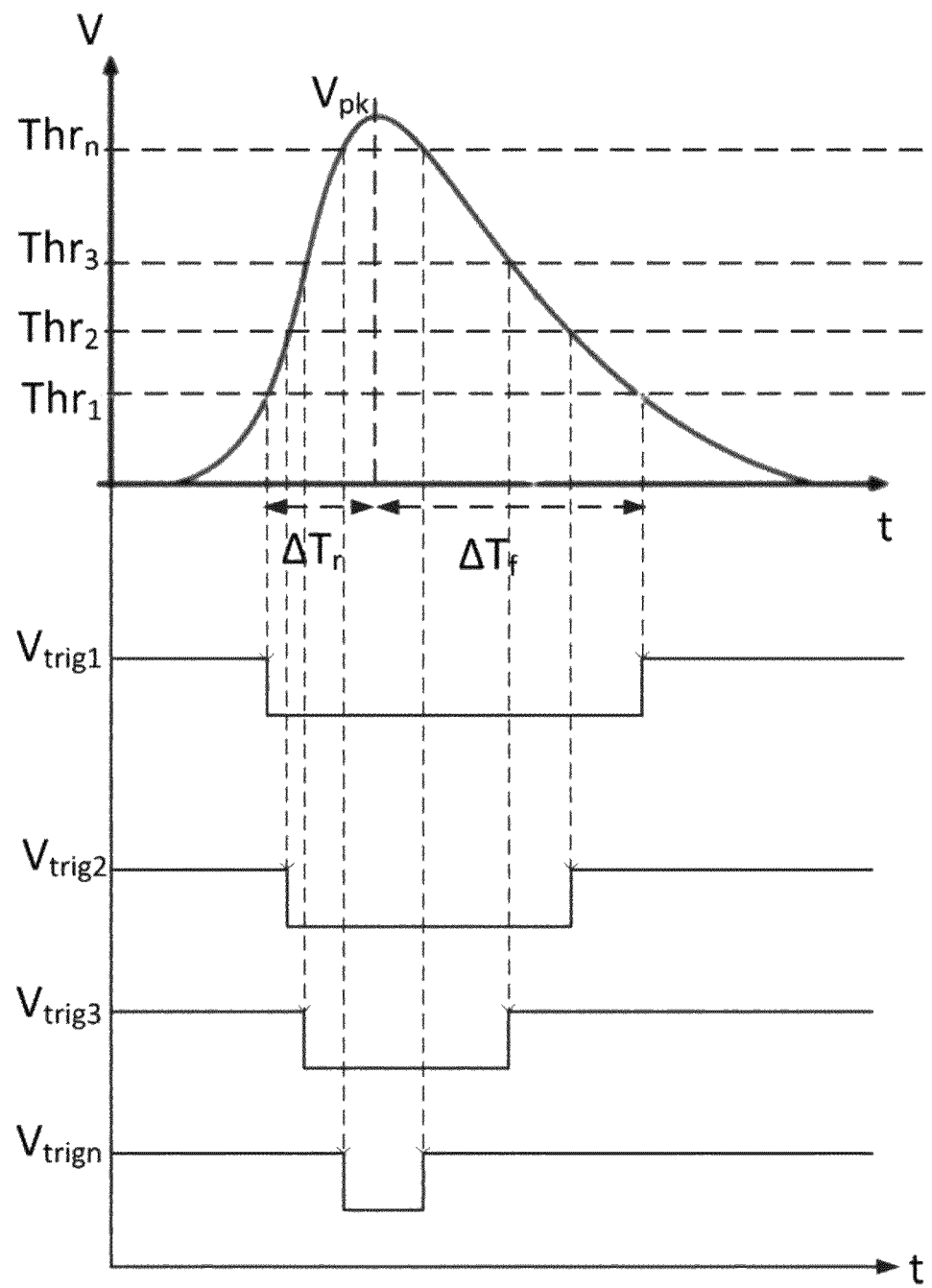
FIGS. 4a-4b illustrate an example of a method for photon counting according to another implementation.
Figure 4B:
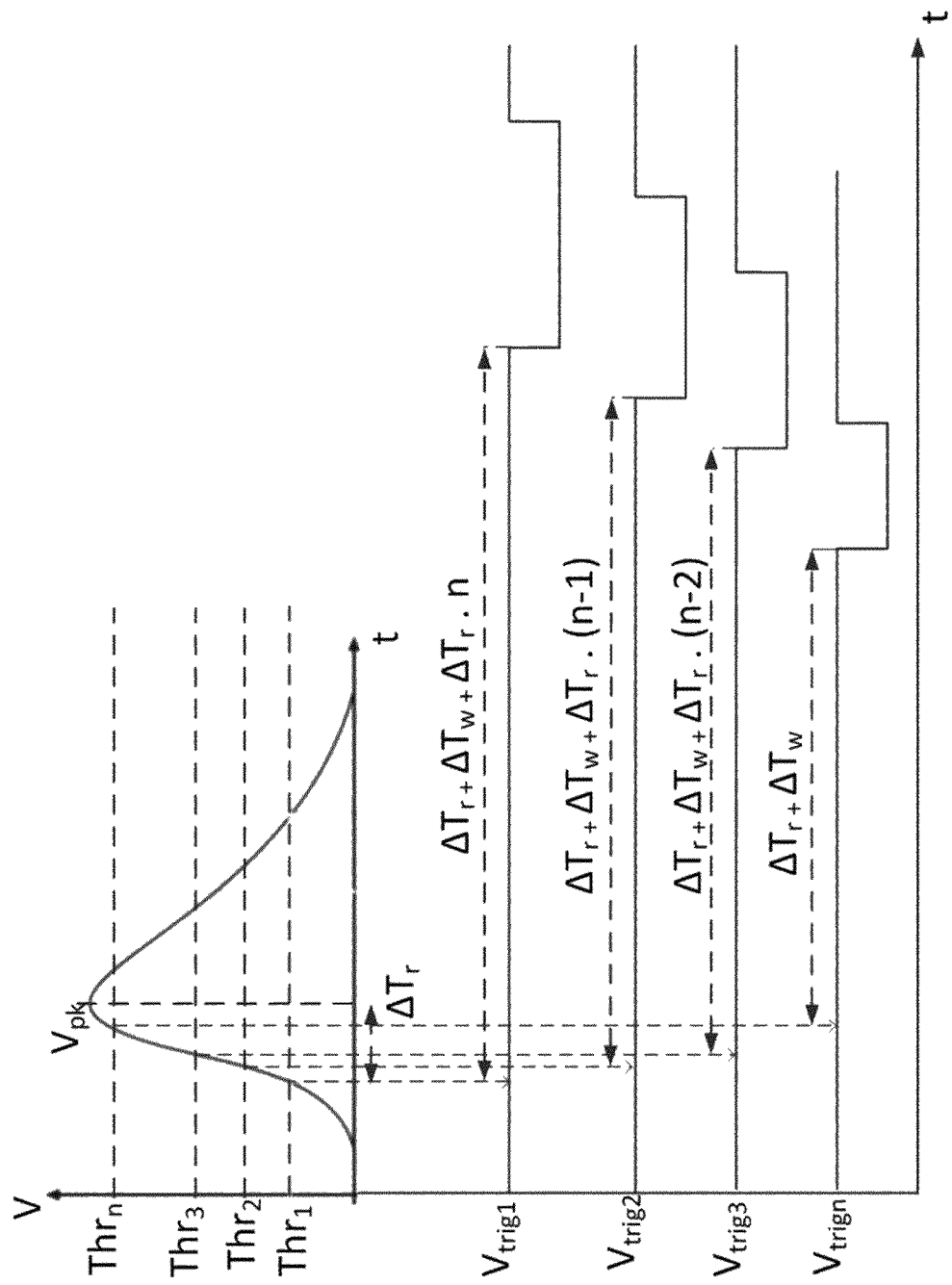

FIGS. 4a and 4b schematically illustrate an alternative method and system for photon counting. As illustrated in FIG. 4a, a plurality of threshold levels may be defined $Thr_1$, $Thr_2$, $Thr_3$, ..., $Thr_n$. As soon, as the signal reaches a threshold level, a trigger occurs. A single signal can thus cause n triggers as illustrated in FIG. 4a.

FIG. 4b schematically illustrates how these different thresholds can be used for effective photon counting while avoiding double counting. Each of the thresholds levels may have different delays. The delay may be set to be shorter for triggers corresponding to higher energy levels.

In the example of FIG. 4b, the registration delay is related to the rise time (such that the peak voltage can be determined reliably), to which a delay is added of a constant (maximum time-walk) and a delay that changes for each of the triggers, e.g. one rise time for the highest threshold, second rise times for the threshold below that, and thus "n" times the rise time for the first threshold.

In different examples, different schemes for delays may be used. For example, instead of adding a single rise time $\Delta T_r$ for each of the consecutive trigger thresholds, a constant $\Delta T_x = \Delta T_r + 20$ nsec could be used. In this case, the delay for the highest threshold could be a walk time $+\Delta T_x$, for the second highest threshold the delay would be the walk time $+2 \Delta T_x$ etc.

In yet further examples, a different constant that is independent of the rise time could be used, e.g. 50 nsec. The delay for the highest threshold would be the time-walk+50 nsec, the delay for the second highest threshold would be the time-walk+100 nsec etc.

Figure 5A:
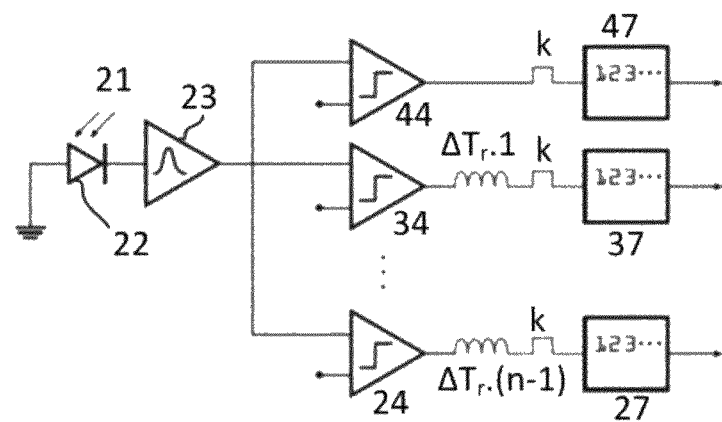
FIGS. 5a and 5b schematically illustrate an example of a system for photon counting according to an implementation.

A schematic arrangement showing the different delays and counters is shown in FIG. 5a. The output of a pulse shaper 23 may be fed to a plurality of discriminators 24, 34, 44 having different threshold values. The delay for registration or triggering is different for each of the discriminators. Of course, a discriminator will not register anything, i.e. there will be no trigger if the peak value of the pulse is below the corresponding trigger threshold.

The set delay for each of the triggers is different. In this example, the delay for each of the triggers may comprise a constant (k) and a part that varies for each of the triggers. If n trigger thresholds are defined, the delay for the highest threshold may be set equal to constant k. Constant k may be (as in the example of FIG. 4b) equal to rise time+walk time. The varying part of the delay may be made dependent on the rise time. For the second highest threshold, this part may be equal to one rise time. For the threshold below that time, it may be equal to two rise times. For the lowest threshold, it may thus be equal to (n−1) rise times. The registration delay for the lowest threshold may thus be equal to $k+(n-1) \Delta T_r$.

Figure 5B:
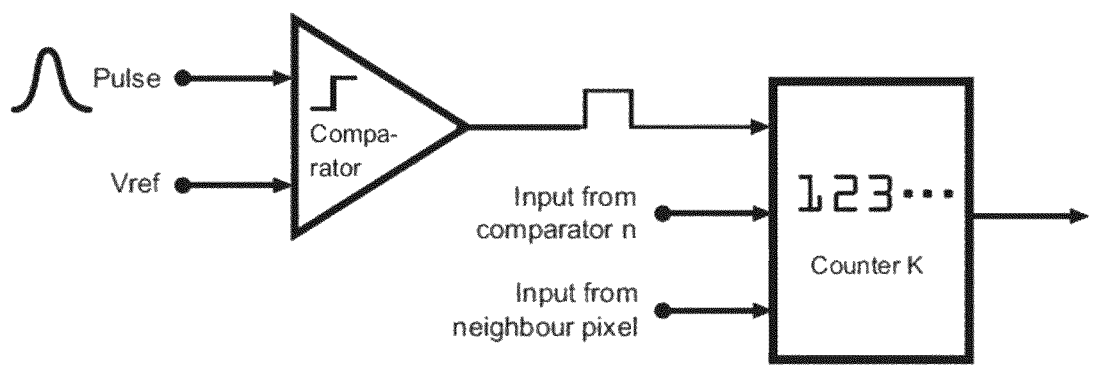

FIG. 5b schematically illustrates how the definitive count can be influenced by the information received from neighbouring pixels. A counter is incremented only if it is not inhibited by a neighbouring pixel or by a comparator belonging to a different threshold.

As illustrated in FIG. 4b, this ensures that the register will occur first for the highest level. Let's imagine that the minimum threshold is set to 10 keV and the step between two thresholds is set to 15 keV. Let us also imagine that there is a total 8 thresholds covering the range from 10 keV to 130 keV for each of the pixels. The thresholds are thus set at 10, 25, 40, 55, 70, 85, 100, 115, and 130 keV.

If a photon has deposited a total energy of 80 keV in one pixel, then the triggers will occur for the levels of 10, 25, 40, 55 and 70 keV. The trigger corresponding to 70 keV will occur first. The counter of capacitor 5 will be incremented by 1.

If the charge is split between two pixels such as 45 keV and 35 keV, then in the first pixel, triggers corresponding to 10, 25 and 40 keV will occur. In the second pixel, the triggers corresponding to 10, and 25 keV will occur. However, the third trigger of the first pixel will be registered first. The counter of trigger 3 will be incremented by 1. At this moment, its registration is communicated to neighbouring pixels, such that the counter of trigger 2 of pixel 2 is not incremented.

This arrangement makes it particularly easy to determine (approximately) the total charge deposited. In this case, the estimated charge is between 40 keV and 55 keV (of pixel 1)+between 25 keV and 40 keV (of pixel 2). The charge may thus be estimated at between 65 keV and 95 keV, or at 80 keV as a mean value.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

What is claimed is:

1. A method for photon counting in a pixelated detector that includes a semiconductor material and a plurality of pixels, the plurality of pixels including a first pixel and a second pixel, the second pixel neighboring the first pixel, the method comprising:
   receiving a deposit of energy in the semiconductor material and, in response, generating a charge;
   collecting a first part of the charge in the first pixel and a second part of the charge in the second pixel, a level of the first part of the charge being greater than a level of the second part of the charge;
   comparing the first part of the charge with a trigger threshold value,
   determining the first part of the charge to be above the trigger threshold value and in response registering the first part of the charge with the first pixel, the registering of the first part of the-charge occurring after a first registration delay, the first registration delay being dependent on the level of the first part of the charge such that the first registration delay decreases with an increase in the level of the first part of the charge;
   determining the second part of the charge to be above the trigger threshold value and in response registering the second part of the charge with the second pixel, the registering of the second part of the charge occurring after a second registration delay, the second registration delay being dependent on the level of the second part of the charge such that the second registration delay decreases with an increase in the level of the second part of the charge, the first registration delay being shorter than the second registration delay; and
   in response to the first part of the charge being registered before the second part of the charge, incrementing only a first counter associated with the first pixel to count the registering of the first charge.

2. The method of claim 1, further comprising collecting the second part of the charge of the second pixel and also collecting other parts of the charge of all other pixels neighboring the first pixel.

3. The method of claim 1, wherein registering the first part of the charge with the first registration delay comprises discharging a capacitor associated with the first pixel at a fixed rate from a maximum level to a reference level after a set delay, wherein the reference level is dependent on the level of the first part of the charge.

4. The method of claim 3, wherein the reference level is equal to or is related to a peak value of the first part of the-charge registered in the first pixel.

5. A pixelated semiconductor detector comprising:
   a semiconductor material configured to receive a deposit of energy and, in response, to generate a charge;
   a plurality of pixels including a first pixel and a second pixel neighboring the first pixel the first pixel being configured to collect a first part of the charge of a first level, the second pixel being configured to collect a second part of the charge of a second level less than the first level;
   a read-out circuit configured to cause a registration of the first part of the charge after a first registration delay and to cause a registration of the second part of the charge after a second registration delay greater than the first registration delay;
   each of the first and second registration delays being respectively dependent on a level of the first part of the charge and the second part of the charge, each of the first and second registration delays respectively decreasing with an increase in the level of the first part of the charge and second part of the charge;
   the read-out circuit including a first counter for the first pixel that is configured to count the registration of the first part of the charge, a second counter for the second pixel that is configured to count the registration of the second part of the charge, and a communication module configured to communicate the registration of the first part of the charge to the second pixel; and
   the read-out circuit being configured so that in response to the registration of the first part of the charge occurring before the registration of the second part of the charge, only the first counter is incremented.

6. The pixelated semiconductor detector of claim 5, wherein the read-out circuit comprises a summing module that is configured to add the first part of the charge and the second part of the charge.

7. The pixelated semiconductor detector of claim 5, wherein the read-out circuit comprises a capacitor configured to discharge after a set delay from a maximum voltage to a reference voltage, wherein the reference voltage is dependent on the first part of the charge collected by the first pixel, and wherein the registration of the first part of the charge occurs once the capacitor reaches the reference voltage.

8. The pixelated semiconductor detector of claim 7, wherein the reference voltage is equal to or is related to a peak value of the first part of the charge.

9. The pixelated semiconductor detector of claim 7, wherein the discharge rate and the set delay are independent from the first part of the charge collected by the first pixel.

10. The pixelated semiconductor detector of claim 7, wherein the capacitor is configured to discharge only if the first part of the charge is above a predetermined threshold.

11. The pixelated semiconductor detector of claim 5, wherein the read-out circuit comprises a plurality of trigger threshold values, each of the trigger threshold values having a different predefined trigger delay, the predefined trigger delay decreases with an increase in the trigger threshold value, the read-out circuit being configured to compare the first part of the charge with each of the trigger threshold values; and if the first part of the charge is above one or more of the trigger threshold values, to register the first part of the charge associated with the shortest predefined trigger delay.

12. The pixelated semiconductor detector of claim 5, wherein the read-out circuit comprises a pulse shaper for each of the first and second pixels.

13. An imaging device comprising a pixelated semiconductor detector according to claim 5.

14. A pixelated semiconductor detector comprising:
- a semiconductor material configured to receive a deposit of energy and, in response, to generate a charge;
- a plurality of pixels, and
- a read-out circuit configured to:
    - register a first part of the charge for a first of the plurality of pixels after a first registration delay and register a second part of the charge for a second of the plurality of pixels after a second registration delay, each of the first and second registration delays being respectively dependent on a level of the first part of the charge and the second part of the charge, each of the first and second registration delays respectively decreasing with an increase in the level of the first part of the charge and second part of the charge,
    - define the first of the plurality of pixels as a master pixel when the first part of the charge is registered before the second part of the charge, and
    - increment a counter for only the master pixel.

15. The pixelated semiconductor detector according to claim 14, wherein the read-out circuit of the master pixel further is configured to determine a level of the first part of the charge collected by the master pixel.

16. The pixelated semiconductor detector according to claim 15, wherein the read-out circuit of the master pixel is further configured to determine parts of the charge collected by all of the plurality of pixels neighboring the master pixel and to assign the parts of the charge to the master pixel.

17. The pixelated semiconductor detector according to claim 14, wherein the read-out circuit comprises for the first of the plurality of pixels a first capacitor configured to discharge when the first part of the charge is above a predefined threshold value, and wherein the first part of the charge is registered when the first capacitor reaches a first reference voltage, the read-out circuit further comprising for the second of the plurality of pixels a second capacitor configured to discharge when the second part of the charge is above the predefined threshold value, and wherein the second part of the charge is registered when the second capacitor reaches a second reference voltage.

18. The pixelated semiconductor detector according to claim 17, wherein each of the first and second reference voltages is respectively dependent on a level of the first part of the charge and a level of the second part of the charge.

\* \* \* \* \*